United States Patent
Pawar et al.

(10) Patent No.: US 10,331,200 B2
(45) Date of Patent: Jun. 25, 2019

(54) APPARATUS, METHOD, AND SYSTEM FOR DYNAMICALLY CONTROLLING PORTS IN DIFFERENT SYSTEM STATES

(71) Applicant: Intel Corporation, Santa Clara, CA (US)

(72) Inventors: Sagar C. Pawar, Bangalore (IN); Anantha Narayanan, Bangalore (IN); Ravindra A. Babu, Bangalore (IN); Aneesh A. Tuljapurkar, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/467,844

(22) Filed: Mar. 23, 2017

(65) Prior Publication Data
US 2018/0275738 A1    Sep. 27, 2018

(51) Int. Cl.
| G06F 13/00 | (2006.01) |
| G06F 1/3287 | (2019.01) |
| G06F 13/42 | (2006.01) |
| G06F 13/40 | (2006.01) |
| G06F 13/38 | (2006.01) |
| G06F 1/26 | (2006.01) |
| G06F 1/3234 | (2019.01) |

(52) U.S. Cl.
CPC ........... *G06F 1/3287* (2013.01); *G06F 1/266* (2013.01); *G06F 1/325* (2013.01); *G06F 13/385* (2013.01); *G06F 13/4022* (2013.01); *G06F 13/4282* (2013.01)

(58) Field of Classification Search
CPC .................... G06F 13/385; G06F 1/3287
See application file for complete search history.

(56) References Cited

U.S. PATENT DOCUMENTS

| 2009/0200982 A1* | 8/2009 | Hurtz | G06F 1/3203 320/103 |
| 2010/0306565 A1* | 12/2010 | Umedu | G06F 1/266 713/324 |
| 2011/0025262 A1 | 2/2011 | Fischer et al. | |
| 2011/0057724 A1 | 3/2011 | Pabon | |
| 2012/0210146 A1 | 8/2012 | Lai et al. | |
| 2012/0246458 A1 | 9/2012 | Jain et al. | |
| 2014/0129856 A1* | 5/2014 | Bertin | G06F 1/266 713/320 |
| 2017/0139467 A1* | 5/2017 | Waters | G06F 1/3287 |

FOREIGN PATENT DOCUMENTS

EP    2738642    6/2014

OTHER PUBLICATIONS

International Search Report and Written Opinion from PCT/US2018/019552 notified Aug. 13, 2018, 18 pgs.

* cited by examiner

*Primary Examiner* — Zachary K Huson
(74) *Attorney, Agent, or Firm* — Green, Howard & Mughal LLP

(57) ABSTRACT

An apparatus system is provided which comprises: a port to selectively receive a device external to the apparatus; a port control circuitry to selectively supply power to the port; and a controller to selectively turn on or turn off the port.

22 Claims, 8 Drawing Sheets

600

The battery charge of the laptop is likely to be exhausted in about 15 minutes (remaining battery charge level – 15%)

Do you want to (please select one):

○ (i) keep on charging the cell phone attached to the laptop without reducing the power delivered to the cell phone, ○ (ii) stop charging the cell phone and turn off the port (that may prolong the battery charge to about 40 minutes), or ○ (iii) reduce the power delivered to the cell phone (that may prolong the battery charge to about 30 minutes)?"

If you do not do select, option (iii) will be selected by default

The back-side USB port number 3 has not been used in the last 9 days. Do you want to turn off this port and save power? If you connect a device to this port, the port will automatically be turned on.

◯ Yes  ◯ No

If a USB port has not been used for certain period, select an option:

◯ (i) Turn of the USB port after not being used for 1 day;

◯ (ii) Turn of the USB port after not being used for 1 hour;

◯ (iii) Turn of the USB port whenever not being used; or

◯ (iv) Never turnoff my USB ports

Fig. 7

APPARATUS, METHOD, AND SYSTEM FOR DYNAMICALLY CONTROLLING PORTS IN DIFFERENT SYSTEM STATES

BACKGROUND

A consumer electronic device (e.g., a laptop, a desktop, etc.) may supply power to a computing device (e.g., a cell phone) via, for example, a Universal Serial Bus (USB) port. The consumer electronic device may have one or more such USB ports. It may be desirable to optimize the supply of power to various USB ports.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 6 illustrates an example user interface window providing a warning associated with one or more ports, according to some embodiments.

FIG. 7 illustrates an example user interface window providing options to configure one or more ports, according to some embodiments.

DETAILED DESCRIPTION

Figure 1:
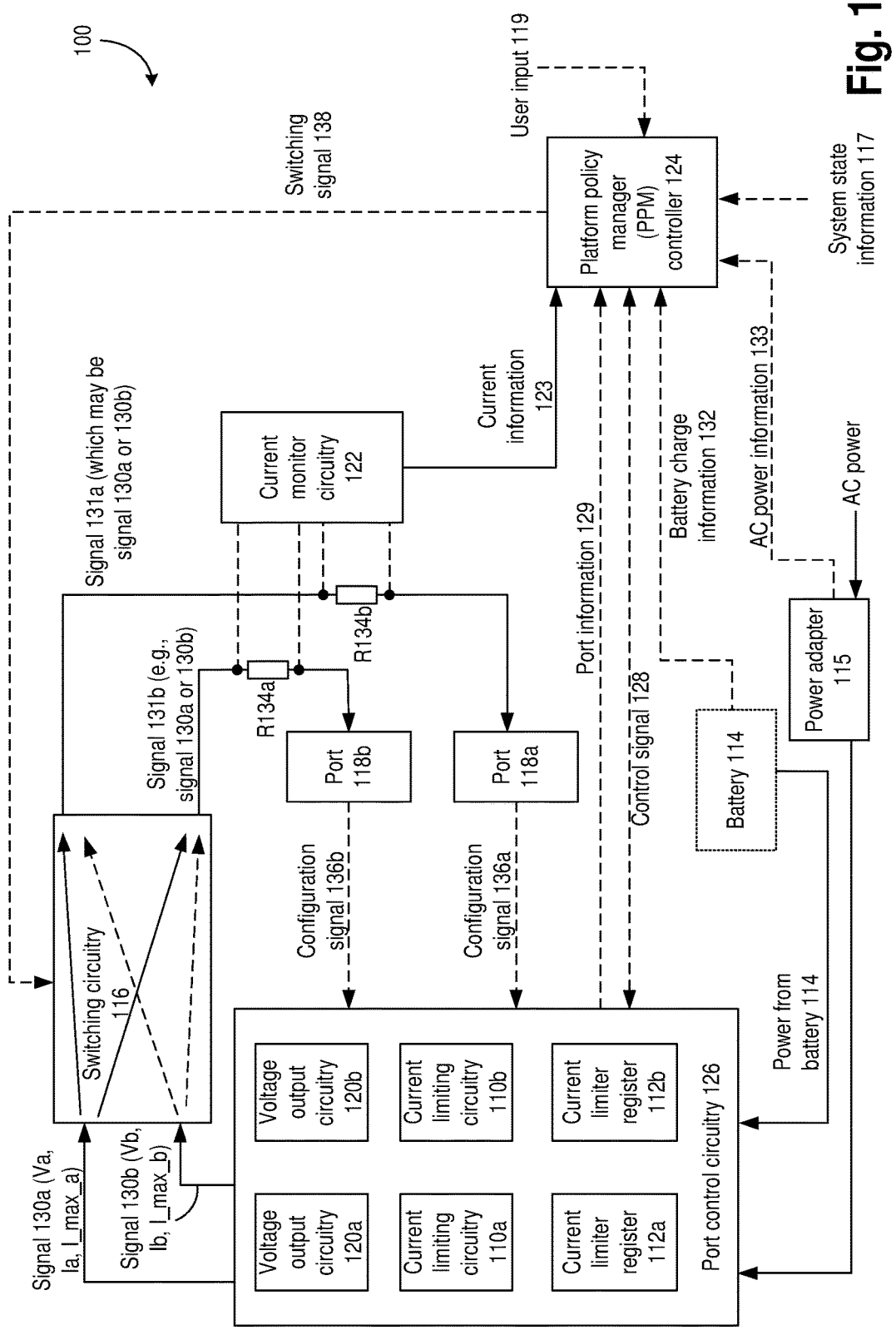
FIG. 1 schematically illustrates a computing system comprising circuitry to dynamically control one or more input/output (I/O) ports, according to some embodiments.

A computing system can have one or more I/O ports, which may be, for example, USB ports (e.g., type-C USB ports). These ports can supply power to attached external devices and/or communicate with the external devices.

In some embodiments, a computing system may dynamically change a power profile of a port, e.g., based on a charge level of the battery of the system, an availability of power for the port, an operating state of the system, a user configurable parameter, etc. Merely as an example, when the battery charge level is above a threshold, the system can have a higher limit on current transmitted through the port and/or a higher voltage level of the port. However, as and when the battery gets depleted, the system may impose lower limits on the current transmitted through the port and/or limit the voltage level of the port. This, for example, ensures that the external device still receives some power when the battery charge level is low, yet the battery charge level is depleted at a much lower rate.

In some embodiments, when a port is not occupied, the system can disconnect or turn off the port, e.g., such that the port does not receive any power. As a result, there may be less, insignificant or zero leakage power through the port. Additionally, the system may reassign the power value originally assigned to the port to other ports of the system. Such dynamic switching of various ports and/or reassignment of power to various other ports may, for example, result in relatively high power assignment to occupied ports and zero power assignment to unoccupied ports.

In some embodiments, a port may be powered (e.g., to supply power to external devices connected to the port) even while, for example, the system operates in a low power mode of operation (e.g., operates in one of S0, S1, S2, S3, S4, or S5 system states). Furthermore, in an example, the system may dynamically change power profile of the ports, e.g., based on the operational state of the system, thereby ensuring that external devices receive power through the ports even while the system operates in a low power mode. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a computing system 100 (henceforth referred to as a "system 100") comprising circuitry to dynamically control one or more input/output (I/O) ports, according to some embodiments. The system 100 may be any appropriate computing system, e.g., a laptop, a cellular or mobile phone, a pedestal computing device (e.g., a desktop), a smart phone, a tablet, a personal digital assistant (PDA), a pager, a wearable device, an Internet-of-things (TOT) device, a modem, a router, a set-top box, or an appropriate consumer electronic device. In some embodiments, the system 100 may be a non-battery operated system (e.g., receiving Alternating Current (AC) power), such as a desktop computer, a pedestal computing device, a server system, etc.

In FIG. 1, some of the signal lines are illustrated using solid lines and some are illustrated using dotted lines merely for the sake of better illustrative clarity and merely to reduce clutter in the figure. Some of the signal lines in FIG. 1 are illustrated to intersect each other, but they may not be electrically coupled at the intersection point, as would be readily understood by those skilled in the art. When two signal lines intersect and are electrically coupled at the intersecting point, such an intersecting point is illustrated using a small dot, as would be readily understood by those skilled in the art.

In some embodiments, the system 100 comprises a power adapter 115 to receive an alternating current (AC) power, and to supply direct current (DC) power to charge a battery 114 and/or to operate the system 100. The battery 114, for example, supplies power to the system 100 when the power from the power adapter 115 is absent and/or the AC power is inadequate. In some embodiments, the battery 114 may be absent from the system 100 (e.g., if the system 100 is a desktop computer or a pedestal computing unit), and hence, the battery 114 is illustrated using dotted line. Although not illustrated in FIG. 1, in some embodiments, the system 100 comprises charging circuitry to charge the battery 114.

In some embodiments, the system 100 further comprises an I/O port (henceforth also referred to as a "port") 118a and a port 118b. Although two ports 118a and 118b are illustrated in FIG. 1, in some other embodiments, the system 100 may comprise a single port, three ports, four ports, or a higher number of ports. In some examples, one or both the ports 118a and 118b are USB ports, e.g., USB type-C (or USB-C) ports. In some other examples, one or both the ports 118a and 118b are Thunderbolt ports. In yet other example, one or both the ports 118a and 118b can operate both as a USB type-C port and a Thunderbolt port. In yet some other examples, one or both the ports 118a and 118b can be any other appropriate type of I/O ports using which external peripheral devices may be attached to the system 100.

In some embodiments, external devices (e.g., which are external to the system 100, not illustrated in FIG. 1) can be connected to the system 100 via the ports 118a and/or 118b. For example, an external device connected to the port 118a can communicate with the system 100 via the port 118a, and/or can receive power (e.g., to charge the external device) via the port 118a.

In some embodiments, the system 100 comprises a port control circuitry 126 (henceforth also referred to as "circuitry 126"). The circuitry 126 supplies signals 130a and 130b to the ports 118a and 118b via a switching circuit 116 (henceforth also referred to as "circuitry 116").

In an example, the circuitry 116 may receive the signals 130a and 130b output by the circuitry 126, and output signals 131a and 131b to the ports 118a and 118b, respectively. In some embodiments, the circuitry 116 may be configured by switching signals 138 from the controller 124. Although not illustrated in FIG. 1, the switching signals 138 may be a combination of a plurality of switching signals. In some embodiments and as illustrated in a subsequent figure, the circuitry 116 may comprise a plurality of switches.

In some embodiments, the circuitry 116 may control the port 118a by performing one of (i) disconnecting the port 118a from the circuitry 126 (e.g., by switching off one or more switches within the circuitry 116), (ii) connecting the signal 131a to the signal 130a (e.g., such that the signal 130a is supplied to the port 118a), or (iii) connecting the signal 131a to the signal 130b (e.g., such that the signal 130b is supplied to the port 118a). In some embodiments, the circuitry 116 may control the port 118b by performing one of (i) disconnecting the port 118b from the circuitry 126 (e.g., by switching off one or more switches within the circuitry 116), (ii) connecting the signal 131b to the signal 130a (e.g., such that the signal 130a is supplied to the port 118b), or (iii) connecting the signal 131b to the signal 130b (e.g., such that the signal 130b is supplied to the port 118b). Thus, the circuitry 116 may control whether the signal 130a or the signal 130b from the circuitry 126 is received by the port 118a (or whether no signal from the circuitry 126 is received by the port 118a), and may similarly control the port 118b.

In an example, the signals 130a and 130b are used by the system 100 to communicate with external devices connected to the ports 118a and 118b. In another example, the signals 130a and 130b are used by the system 100 to supply power to the external devices connected to the ports 118a and 118b (e.g., to charge the external devices).

In some embodiments, the signals 130a and 130b have voltages Va and Vb, respectively. The voltages Va and Vb can have any appropriate values, which may be based on a configuration of the circuitry 126, the types of the ports 118a and 118b, types of external devices connected to the ports 118a and 118b, etc. Merely as an example, if the ports 118a and 118b are USB type-C ports, the voltage Va can be one of 5 volts (V), 9V, 12V, and 20V, and the voltage Vb can also be one of 5 volts (V), 9V, 12V, and 20V (although voltages Va and Vb can have another appropriate value). In some embodiments, the circuitry 126 controls the signals 130a and 130b such that the signals 130a and 130b can have maximum current values I_max_a and I_max_b, respectively.

In some embodiments, the circuitry 126 comprises voltage output circuitries 120a and 120b for respectively outputting the signals 130a and 130b with voltage levels Va and Vb, respectively. The voltage output circuitries 120a and 120b can be of any appropriate type (e.g., may comprise voltage regulators). In some embodiments, the circuitry 126 further comprises current limiting circuitries 110a and 110b for respectively controlling the maximum current values I_max_a and I_max_b of the signals 130a and 130b, respectively. The circuitry 110a and/or the circuitry 110b, for example, comprises operational amplifiers and/or other circuit elements that may limit the maximum currents of the signals 130a and 130b to the maximum current values I_max_a and I_max_b, respectively.

In some embodiments, the circuitry 126 further comprises current limiter registers 112a and 112b (henceforth referred to as registers 112a and 112b, respectively). In an example, a value written in the register 112a controls the maximum current value I_max_a. Merely as an example, assuming that the register 112a is a two-bit register, if 00 is written to the register 112a, the maximum current value I_max_a imposed by the current limiting circuitry 110a may be 300 milli-Amperes (mA); if 01 is written to the register 112a, the maximum current value I_max_a imposed by the current limiting circuitry 110a may be 1 Ampere (A); if 10 is written to the register 112a, the maximum current value I_max_a imposed by the current limiting circuitry 110a may be 1.5 A; and if 11 is written to the register 112a, the maximum current value I_max_a imposed by the current limiting circuitry 110a may be 3 A. The register 112b may also similarly control the maximum current value I_max_b.

In some embodiments, the circuitry 126 may generate the signals 130a and 130b based on receiving power from the power adapter 115 and/or power from the battery 114. For example, when the power adapter 115 is coupled to the AC supply, the circuitry 126 may receive power from the power adapter 115 (and optionally from the battery 114 as well). When the power adapter is not coupled to the AC supply, the circuitry 126 may receive power from the battery 114.

In some embodiments, a current monitor circuitry 122 (henceforth also referred to as "circuitry 122") may estimate currents Ia and Ib of the signals 130a and 130b, respectively. The circuitry 122 may estimate the currents Ia and Ib of the signals 130a and 130b using any appropriate method. Merely as an example, resistors R134a and R134b may be connected in the signal lines 130a and 130b, respectively. The circuitry 122 may measure the voltage drops across the resistors R134a and R134b to respectively estimate the currents Ia and Ib of the signals 130a and 130b, as illustrated in FIG. 1. In some embodiments, the circuitry 122 may provide the estimates of the currents Ia and Ib of the signals 130a and 130b, respectively, to the controller 124 as, for example, current information 123.

In some embodiments, the port 118a may transmit a configuration signal 136a to the circuitry 126 when, for example, an external device is attached or coupled to the port 118a. The configuration signal 136a may indicate a type of the external device, a configuration of the external device, a voltage requirement of the external device, and/or the like. Merely as an example, if a first external device is coupled to the port 118a during a first time-period and if the first external device is rated or configured to receive 5V from the port 118a, then the configuration signal 136a may indicate that information—accordingly, the circuitry 120a may output the signal 130a with the voltage Va being 5V (and the switching circuitry 116 may supply the signal 130a to the port 118a). In some embodiments, the configuration signal 136a may also indicate a current requirement of the first external device. Merely as an example, the first external device may have a maximum current requirement of 1 A, and the configuration signal 136a may indicate such a maximum current requirement to the circuitry 126. In some embodiments, the configuration signal 136b may also indicate to the circuitry 126 similar information about external devices being coupled to the port 118b. In some embodiments, if no external device is coupled or attached to a port (e.g., port 118a), the corresponding configuration signal (e.g., configuration signal 136a) may also indicate such information to the circuitry 126. In some embodiments, the port 118b may also transmit a similar configuration signal 136b to the circuitry 126.

In some embodiments, the system 100 comprises a platform policy manager (PPM) controller 124. In some embodiments, the controller 124 may be implemented using hardware, software, or a combination of hardware and software. In some embodiments, the controller 124 may be implemented using appropriate logic and/or circuitry. In some embodiments, the controller 124 may control various aspects of an operation of the system 100. In some embodiments, the controller 124 may generate switching signals 138 for controlling the switching circuitry 116, which is discussed in further detail in a subsequent figure.

In some embodiments, the controller 124 may receive a current battery charge level from the battery 114, e.g., if the battery 114 is present in the system 100. For example, the controller 124 may receive an indication as to whether the battery 114 is about 100% charged, about 50% charged, etc. In some embodiments, the controller 124 may also receive other appropriate information about the battery 114, e.g., an indication of whether the battery 114 is current being charged using power from an external AC source, a rate with which the battery 114 is being charged, a rate with which the charge of the battery is being depleted, an estimated amount of time the charge of the battery 114 is likely to last, etc. All such information received by the controller 124 from the battery is collectively referred to as battery charge information 132 in FIG. 1. Although FIG. 1 illustrates the controller 124 receiving the battery charge information 132 from the battery 114, in some examples, the controller 124 may receive the battery charge information 132 from another appropriate component connected to the battery 114 (e.g., a battery control circuitry, a battery fuel gauge, a battery charge gauge, and/or the like, not illustrated in FIG. 1).

In some embodiments, the controller 124 may receive AC power information 133, which, for example, may indicate whether AC power is available for charging the battery 114 and/or operating the system 100. Although FIG. 1 illustrates the controller 124 receiving the AC power information 133 from the power adapter 115, in some examples, the controller 124 may receive the AC power information 133 from another appropriate source (e.g., an operating system, a power control circuitry, a power manager, etc., not illustrated in FIG. 1).

In some embodiments, the controller 124 may receive user input 119. The user input 119 may, for example, configure the controller 124 to appropriately control the ports 118, as will be discussed herein in further detail. Examples of user input are discussed herein later, e.g., with respect to FIGS. 6 and 7.

In some embodiments, the controller 124 may receive system state information 117. The system state information 117 may, for example, indicate a current operational state of the system 100. For example, the system 100 may operate in a normal or regular state, a low power state, an off state, a hibernation state, or the like. Merely as an example, the system 100 may operate in one of various states defined in the Advanced Configuration and Power Interface (ACPI) specification (e.g., revision 3.0 released on September 2004, or any earlier or later versions). For example, the ACPI specification discusses a S0 working state or normal operation state, and low power states S1, S2, S3, and S4. For example, state S1 is a power on suspend (POS) state during which, for example, processor caches may be flushed, and the processors may stop executing instructions. State S2 may be a CPU powered off state, and dirty cache may be flushed to random access memory (RAM). State S3 may be a standby, sleep, or suspend to RAM (STR) state, in which the RAM may remain powered. State S4 may be a hibernation or suspend to disk state, and contents of the main memory may be saved to non-volatile memory such as a hard drive, and the system may be powered down. State S5 may be a soft off state, and the power supply unit (PSU) may still supply power, at a minimum, to the power button to allow return to state S0, and some components may remain powered so the computer can wake on input from the keyboard, clock, modem, etc. In some embodiments, the system state information 117 may indicate a current operating state of the system 100, e.g., whether the system 100 operates in one of states S0, . . . , S5. The controller 124 may receive the system state information 117 from an appropriate source (e.g., an operating system, a power control circuitry, a state control circuitry, etc., not illustrated in FIG. 1).

In some embodiments, the controller 124 may also receive port information 129 from the circuitry 126. The port information 129, for example, may include information such as whether any external devices are coupled or attached to the ports 118a and 118b, ratings and voltage/current requirements of any device attached to the ports 118a and 118b, and/or the like.

In some embodiments, based on one or more of the battery charge information 132, the AC power information 133, the user input 119, the current information 123, the port information 129, the system state information 117, and/or the like, the controller 124 may control the ports 118a and 118b. In an example, the controller 124 may control, for example, the port 118a by controlling a current profile of the port 118a (e.g., by setting a maximum current that can be supplied to the port 118a) and/by controlling a voltage profile of the port 118a (e.g., by controlling the circuitry 116, thereby controlling whether the voltage Va or the voltage Vb is supplied to the port 118a). In another example, the controller 124 may control, for example, the port 118a by disconnecting the port 118a from the circuitry 126 via the circuitry 116.

In some embodiments, the controller 124 may control the current profile of the ports 118 by generating a control signal 128 to control the circuitry 126. For example, the controller 124 may control the contents of the registers 112a and/or 112b of the circuitry 126, e.g., via the control signal 128. Also, as discussed, in an example, the registers 112a and 112b control the maximum current values I_max_a and I_max_b imposed by the circuitry 110a and 110b, respectively, on the signals 130a and 130b (although in another example, the registers 112a and 112b may control the actual currents Ia and Ib of the signals 130a and 130b). Thus, in some embodiments, the controller 124 may control the maximum current values I_max_a and I_max_b of the signals 130a and 130b, respectively, e.g., via the control signal 128. Although FIG. 1 illustrates a single signal line corresponding to the control signal 128, in some embodiments, the control signal 128 may comprises at least two separate control signals for respectively controlling the registers 112a and 112b.

Merely as an example, when the battery 114 is fully charged (or charged above a high threshold limit) and/or when the power adapter 115 receives AC power, the controller 124 may not desire to control the current profile of the signals 130a and 130b. In such a situation, the current profile of the signals 130a and 130b (e.g., the maximum current values I_max_a and I_max_b of the signals 130a and 130b) may be determined by various other factors, e.g., based on configuration or rating of the external devices connected to the ports 118a and 118b (e.g., as indicated by the configuration signals 136a and 136b), based on the configuration of the circuitry 126, etc. However, when the battery 114 is not fully charged (or charged below the high threshold limit) and/or when the power adapter does not receive any AC power, the controller 124 may start controlling the current profile of the signals 130a and/or 130b, e.g., by imposing limits on the maximum current values I_max_a and/or I_max_b.

For example, a configuration or rating of an external device (which may be a cellular phone, for example) connected to the port 118a may dictate that the maximum current value I_max_a be 3 A, e.g., which may be used to charge the cellular phone. As long as the battery 114 is fully charged (or charged above the high threshold limit) and/or when the power adapter receives AC power, the circuitry 126 may set the maximum current value I_max_a to be 3 A, e.g., without any intervention from the controller 124. However, if the power adapter does not receive the AC power and/or if, for example, the charge level of the battery 114 is below the high threshold level, the controller 124 may decrease the maximum current value I_max_a. For example, the controller 124 may write an appropriate value in the register 112a using the control signal 128, which may result in the circuitry 110a decreasing the maximum current value I_max_a.

Controlling the current profile of the ports 118a and/or 118b is discussed in further details in a co-pending U.S. patent application Ser. No. 15/467,874, which is incorporated by reference herein in entirety.

Figure 2:
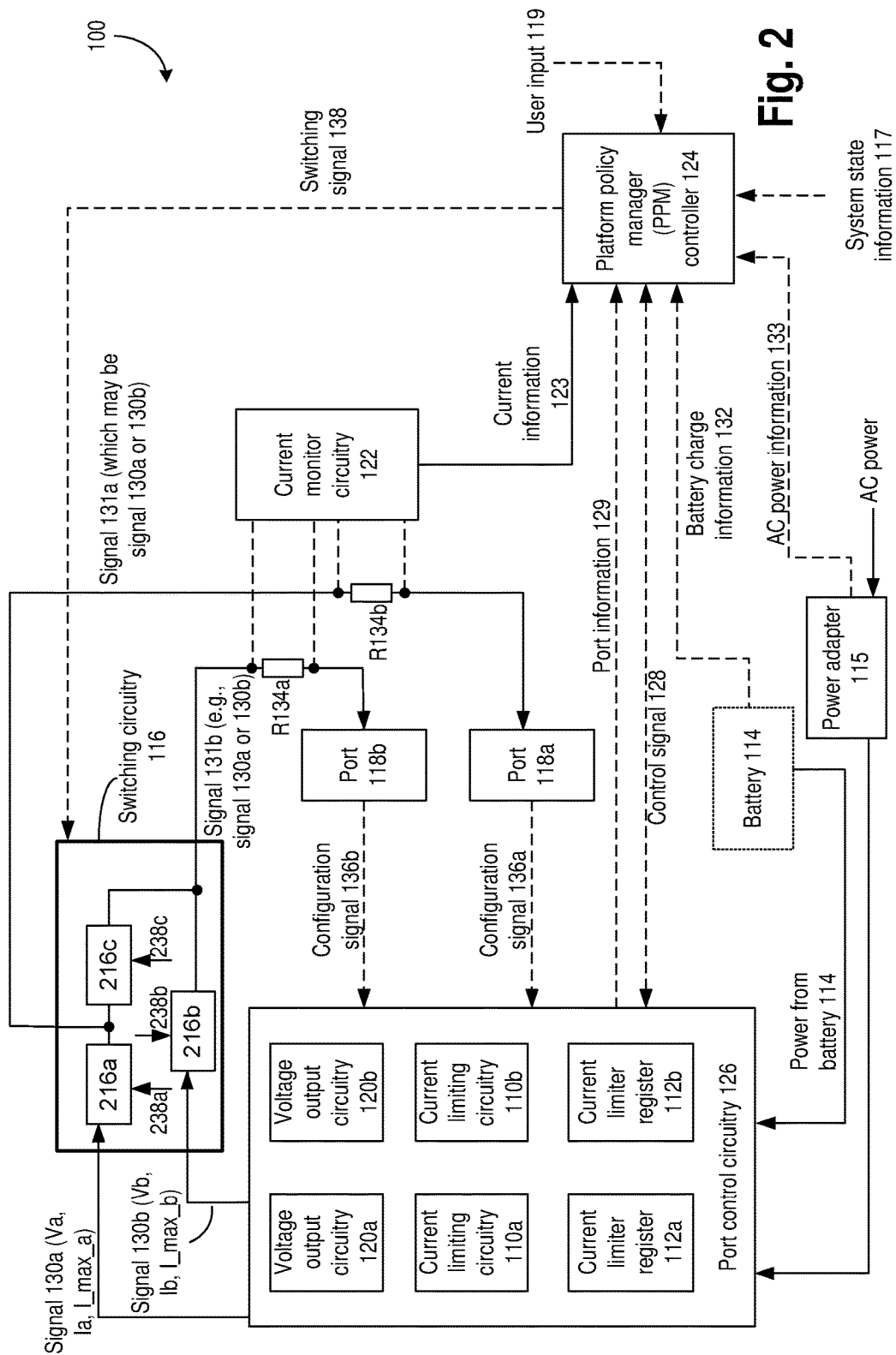
FIG. 2 schematically illustrates an example implementation of a switching circuitry of the computing system of FIG. 1, according to some embodiments.

FIG. 2 schematically illustrates an example implementation of the switching circuitry 116 of the system 100 of FIG. 1, according to some embodiments. In the example implementation of FIG. 2, the circuitry 116 may comprise switches 216a, 216b, and 216c. The switches 216a, 216b, and 216c can be implemented using any appropriate components, e.g., any appropriate type of transistors. In some embodiments, the switching signals 138 may comprise three separate switching signals 238a, 238b, and 238c, which may be supplied from the controller 124 to control the switches 216a, 216b, and 216c, respectively.

In some embodiments, the switches 216a and 216c may be connected in series between the signals 130a and 131b. Also, the switch 216b may be connected between the signals 130b and 131b. In some embodiments, the signal 131a may be generated from a connection between the switches 216a and 216c.

There may be different example scenarios for operating the circuitry 116, as follows:

Scenario 1: switches 216a and 216b are on, and 216c is off. In scenario 1, the port 118a receives the signal 130a with the voltage Va, and the port 118b receives the signal 130b with the voltage Vb. That is, in scenario 1, the ports 118a and 118b receive voltages Va and Vb, respectively, and the currents Ia and Ib, respectively.

Scenario 2: switches 216a and 216c are on, and switch 216b is off. In scenario 2, the port 118a receives the signal 130a with voltage Va and current Ia, and the port 118b also receives the signal 130a with voltage Va and current Ia.

Scenario 3: switches 216b and 216c are on, and switch 216a is off. In scenario 3, the port 118a receives the signal 130b with voltage Vb and current Ib, and the port 118b also receives the signal 130b with voltage Vb and current Ib.

Scenario 4: all switches 216a, 216b, and 216c are off. In scenario 4, the ports 118a and 118b are disconnected from the circuitry 126, and does not receive either of signal 130a or 130b.

Scenario 5: switch 216b is on, and switches 216a and 216c are off. In scenario 5, the port 118a is disconnected from the circuitry 126 and does not receive either of signal 130a or 130b; and the port 118b receives the signal 130b with voltage Vb and current Ib.

Scenario 6: switch 216a is on, and switches 216b and 216c are off. In scenario 5, the port 118b is disconnected from the circuitry 126 and does not receive either of signal 130a or 130b; and the port 118a receives the signal 130a with voltage Va and current Ia.

It should be appreciated that while FIG. 2 illustrates an example implementation of the circuitry 116, the circuitry 116 can be implemented in any other appropriate manner, as would be readily understood by those skilled in the art based on the teachings of this disclosure. Furthermore, additional switches may be added to the circuitry 126 to introduce even more flexibility and options (e.g., additional switches may be introduced to introduce an option of the port 118a receiving the signal 130b, and the port 118b receiving the signal 130a).

Referring again to FIG. 1, the controller 124 may appropriately control the circuitry 116 so that it may be possible to supply any of the two voltages Va and Vb to any of the ports 118a and 118b. Thus, the controller 124 may appropriately control the circuitry 116 so that it may be possible to control the voltages supplied to these ports. Hence, the controller 124 may appropriately control the circuitry 116 to control a voltage profile of the ports 118a and/or 118b.

Also, as previously discussed with respect to FIG. 1 herein, the system 100 may also control the currents Ia and/or Ib (or at least the maximum possible values of these currents), thereby controlling the current profile of the ports 118a and 118b. Thus, the system 100 of FIG. 1 may control the power supplied to the ports 118a and 118b, e.g., by appropriately controlling the voltage profile and the current profile of each port. Hence, the system 100 may control a power profile of the ports 118a and 118b.

Controlling a current profile, a voltage profile, and/or a power profile of the ports 118a and/or 118b are discussed in further details in a co-pending U.S. patent application Ser. No. 15/467,874, which is incorporated by reference herein in entirety.

Figure 3:
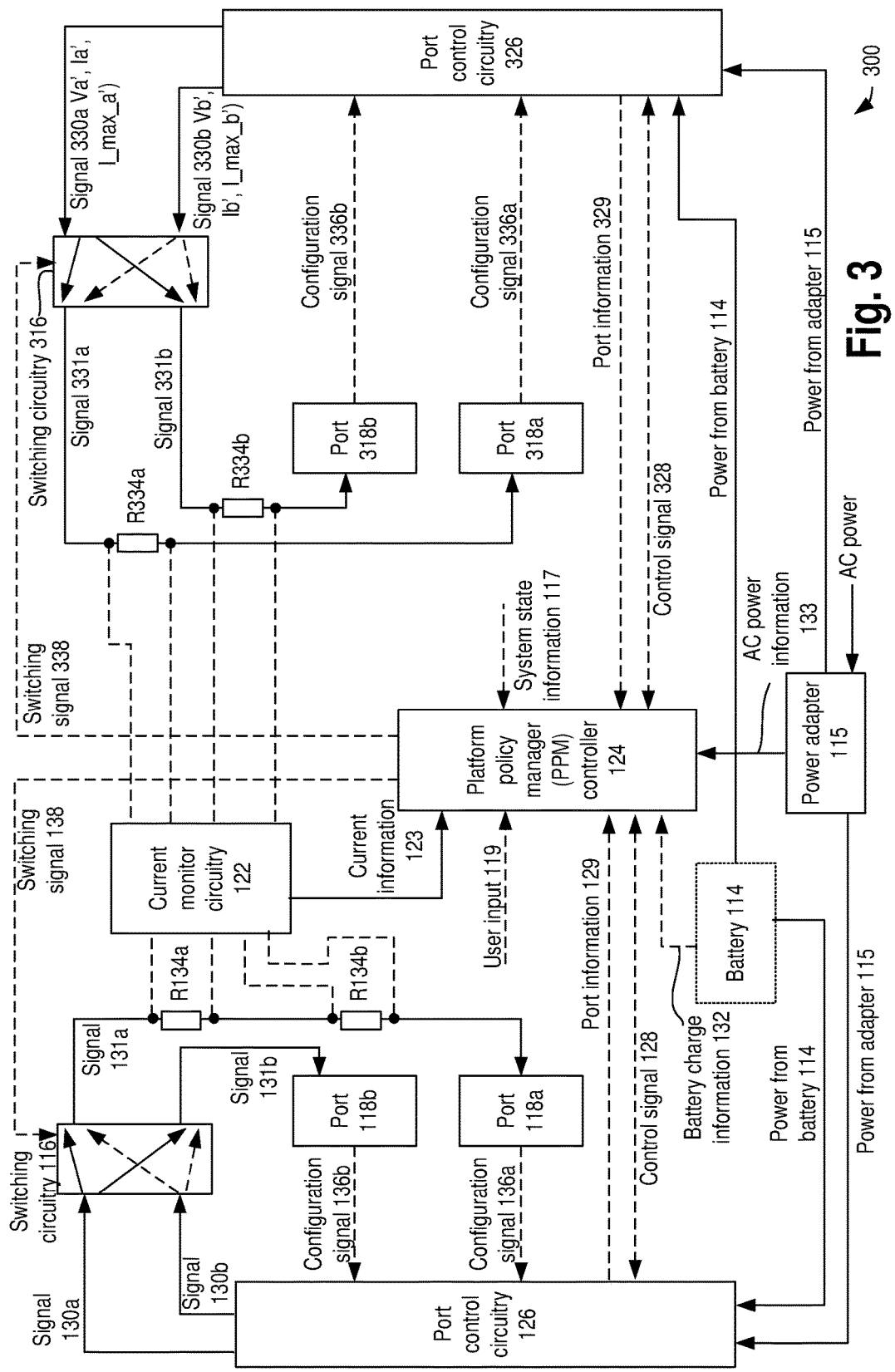
FIG. 3 schematically illustrates a computing system comprising circuitry to dynamically control four I/O ports, according to some embodiments.

FIGS. 1 and 2 illustrate controlling two ports 118a and 118b. However, in some other embodiments, more than two ports may be controlled. FIG. 3 schematically illustrates a computing system 300 (henceforth also referred to as a "system 300") comprising circuitry to dynamically control four I/O ports, according to some embodiments. For example, the system 300 comprises the ports 118a, 118b of FIG. 1, and also comprises ports 318a and 318b. The system 300 further comprises a port control circuitry 326 (also referred to herein as "circuitry 326") for controlling the ports 318a and 318b, where the circuitry 326 may be at least in part similar to the circuitry 126.

The switching circuitry 316 (also referred to herein as "circuitry 316") may receive signals 330a and 330b from the circuitry 326. The signal 330a may have a voltage, current, and a maximum current of Va', Ia', and I_max_a', respectively. The signal 330b may have a voltage, current, and a maximum current of Vb', Ib', and I_max_b', respectively. The circuitry 316 may supply signals 331a and 331b to the ports 318a and 318b, respectively, where the signal 331a may be one of signals 330a and 330b, and the signal 331b may be one of signals 330a and 330b. The current monitor circuitry 122 may monitor current levels of the signals 331a and 331b, for example, using resistors R334a and R334b, respectively, and transmit the measurement information via the current information 123 to the controller 124. The ports 318a and 318b may transmit configuration signals 336a and 336b, respectively, to the circuitry 326. The circuitry 326 may transmit port information 329 to the controller 124, and may exchange control signals 328 with the controller 124.

Various elements and signals newly introduced in the system 300 (e.g., as compared to the system 100) may be at least in part similar to the corresponding components of the system 100 (e.g., the circuitry 326 may be at least in part similar to the circuitry 126, the configuration signals 336a, 336b may be at least in part similar to the configuration signals 136a, 136b, etc.), and hence, these elements and signals will not be discussed in further details herein.

In some examples, the ports 118a and 118b may be front USB ports (e.g., type-C USM ports) of a desktop computing device, and the ports 318a and 318b may be back USM ports (e.g., type-C USM ports) of the desktop computing device. For example, the ports 118a, 118b may be located at or near the front side of the computing device, whereas the ports 318a, 318b may be located at or near the back side. In some examples, the ports 118a, 118b, 318a, and 318b may be any appropriate USB ports (e.g., type-C USM ports) of an appropriate computing device.

Various modification of the system 300 may be easily envisioned by those skilled in the art, based on the teachings of this disclosure. For example, although FIG. 3 illustrates the circuitry 126 controlling ports 118a, 118b and the circuitry 326 controlling ports 318a, 318b, each of these circuitries may control any different number of ports. In some embodiments, the circuitries 126 and 326 may be combined in a single circuitry. Similarly, in some embodiments, the circuitries 116 and 316 may be combined in a single switching circuitry. In some embodiments, instead of a single controller 124, there may be two controllers for the two corresponding circuitries 126 and 326. Other modifications of the system 300 may also be easily envisioned by those skilled in the art, based on the teachings of this disclosure.

In some embodiments, as discussed with respect to FIG. 1, the circuitry 126 may dynamically monitor the ports 118a, 118b, e.g., via the configuration signals 136a, 136b. Similarly, in some embodiments, the circuitry 326 may dynamically monitor the ports 318a, 318b, e.g., via the configuration signals 336a, 336b. For example, based on such monitoring, the circuitries 126, 326 may determine if, at any point in time, a port is not occupied by an external device (e.g., no external device is attached to or coupled to the port). The circuitries 126, 326 may transmit such occupancy information (e.g., where individual ports are occupied or not) to the controller 124 via, for example, the port information signals 129 and 329, respectively.

In some embodiments, if a port is not occupied, the controller 124 may "turn off" the port via, for example, the circuitry 116 or the circuitry 316. Merely as an example, if the port 318b is not currently occupied, the controller 124 may "turn off" or disconnect the port 318b from the circuitry 326 by appropriately configuring the circuitry 316 via the switching signals 338.

In some embodiments, the controller 124 may take into account various factors in determining whether to turn off a port (where turning off a port, e.g., the port 318b, may imply disconnecting the port 318b from the circuitry 326 by appropriately configuring the circuitry 316 via the switching signals 338). Merely as an example, the controller 124 may take into account a historical usage of a port, a frequency of use of the port, and/or a current occupancy information of the port in determining whether to turn off the port. For example, a desktop computer may have a few USB type-C ports in the front and a few USB type-C ports in the back side. The back side may not be easily accessible to the user, and hence, the user may use the back-side ports less frequently. For example, the user may use a back-side port for connecting a display to the computing device, and may not use another back-side port at all. Whenever the user may need to use a USB port (e.g., to connect a cell phone or a peripheral device to the computing device), the user may use the front-side ports (e.g., because the front-side ports may be easily accessible to the user). Accordingly, a back-side port (e.g., the port 318b) may historically have very few or zero occupancy rate in the past. Accordingly, the controller 124 may turn off the port 318b on a permanent or semi-permanent basis (e.g., until a peripheral device is connected to the port 318b). However, because a front-side port 118b may be frequently used, the controller 124 may not turn off the port 118b.

In some embodiments, the controller 124 may turn off a port if the port is not being occupied for at least a threshold period of time. In some embodiments, the controller 124 may turn off a port if the port is not currently being occupied. In some embodiments, the controller 124 may turn off a port if the port is being occupied less frequently in the past and also is not current being occupied. In some embodiments, the controller 124 may turn off a port based on the combination of the above factors. In some embodiments, the controller 124 may turn off a port based on one or more other criterion, e.g., availability of power from the battery 114 and/or the adapter 115 to fully or partially power the port.

In some embodiments, turning off a port may prevent or reduce leakage current through the port. In some embodiments, turning off a port may free power that may be assigned to other occupied ports. For example, in some embodiments, the controller 124 may have certain maximum power that may be assigned to various ports. Merely as an example, the controller 124 may have a maximum of 10 Watts (W) to assign to the ports (although such a wattage is merely an example and merely for explaining the principles of this disclosure). Such a maximum wattage limitation may be based on power available from the battery 114 and/or the adapter 115, power requirement by other components of the system 100, a system operating state of the system 300, and/or the like. In a simple example, the controller 124 may assign 2.5 W to each of the ports 118a, 118b, 318a, and 318b. Based on the such a 2.5 W assignment, the controller 124 may determine an appropriate power profile (e.g., a voltage profile and/or a current profile) for the ports.

However, the controller may decide to turn off, for example, ports 118a and 318b (e.g., based on various criteria discussed herein above). Turning off the two ports may make available 10 W to be assigned to the remaining ports 118b and 318a, which may be occupied by external devices. The controller 124 may assign power to these two occupied ports, e.g., based on power requirements of the external devices connected to these two ports. For example, if a device connected to the port 118b may demand more power than a device connected to the port 318a, the controller 124 may assign, for example, 6.5 W to the port 118b and may assign 3.5 W to the port 318a. For example, the controller 124 may control the voltage profile and/or the current profile of these two ports to assign such power in such a manner.

For example, a voltage level and/or a maximum current level of the signal 131b to the port 118b may be more than these parameters of the signal 331a to the port 318a, thereby assigning more power to the port 318a than the port 118b.

Thus, in an example, if the ports 118a and 318b were not turned off, the controller 124 would have 10 W to be assigned to four ports. However, turning off these two ports may make available 10 W for assignment to merely two occupied ports (e.g., instead of the four ports). Thus, in some embodiments, the controller 124 may selectively turn on or turn off individual ports, and re-assign power from turned off ports to remaining occupied ports.

In some embodiments, when assigning power to occupied ports, the controller 124 may take into account power requirement (e.g., voltage requirement and/or current requirement) of external devices connected to these ports. For example, in the above discussed example, a device connected to the port 118b may demand more power than a device connected to the port 318a. Accordingly, the controller 124 may assign, for example, 6.5 W to the port 118b and may assign 3.5 W to the port 318a.

In some embodiments, power available for assignment to various ports may change dynamically. For example, when the system 300 receives AC power via the adapter 115 and/or when the charge level of the battery 114 is above a threshold level, the system 300 may have higher power for assignment to the ports. However, when the system is not receiving AC power, when power requirement of various other components of the system 300 is high, and/or when the charge level of the battery 114 is below a threshold level, the system 300 may have lower power for assignments to the ports. The system 300 may, in such scenarios, selectively turn off one or more ports and/or reduce power profiles of one or more ports.

In some embodiments, the selective turning on and off of ports, and selective supply of power to the ports can occur when the system operates in the S0 working state or normal operation state of operation, as well as when the system operates in a low power state (e.g., in one of the states S1, S2, S3, S4, or S5 discussed previously).

For example, when the system enters the low power mode (e.g., one of the states S3, S4, or S5), several components of the system 300 may be deactivated, turned off, or put in a sleep mode. However, the circuitries 126 and/or 326 (or at least some components of these circuitries) may continue to be operational and may continue to monitor or scan the configuration signals 136a, 136b, 336a, and/or 336b. If a port is occupied (e.g., as indicated by the corresponding configuration signal), the circuitries 126 and/or 326 may continue supplying power to the occupied port. For example, if none of the ports are occupied, the controller 124, the circuitry 122, the switching circuities 116, 326, etc. can enter a low power or sleep mode when the system operates in one of the states S3, S4, or S5—however, the circuitries 126 and/or 326 may continue to be operational and may continue to monitor the configuration signals 136a, 136b, 336a, and/or 336b. If and when a port is occupied, components for supplying power to the port can be activated and the system 300 can supply power to the port (e.g., based on a power profile selected by the controller 124).

Thus, even when the system 300 is in a low power state (e.g., is a standby state, sleep state, suspend to RAM state, hibernation state, suspend to disk state, a soft off state, etc.), the system 300 can continue providing power to the occupied ports. The unoccupied ports, for example, may be turned off or disconnected.

In some embodiments, power available for assignment to various ports may change dynamically based on a state of the system 300. For example, when the system 300 is in a S0 working state, many other components of the system (e.g., a processor, a memory, a display, etc.) may be operational. Accordingly, relatively less power may be available for assignment to the occupied ports. However, when the system 300 enters a low power state (e.g., one of the states S3, S4, or S5), many components of the system 300 (e.g., processor, cache, memory, display, etc.) may enter a low power mode or off mode, and hence, may consume less power or no power. Accordingly, when the system 300 enters a low power state, power available for assignment to the ports may increase, and accordingly, the controller 124 may increase the power profile (e.g., assign more power) to the occupied ports. Such reassignment of power profiles may be based on available power from the battery 114 and/or AC power from the adapter 115, as previously discussed herein.

Figure 4:
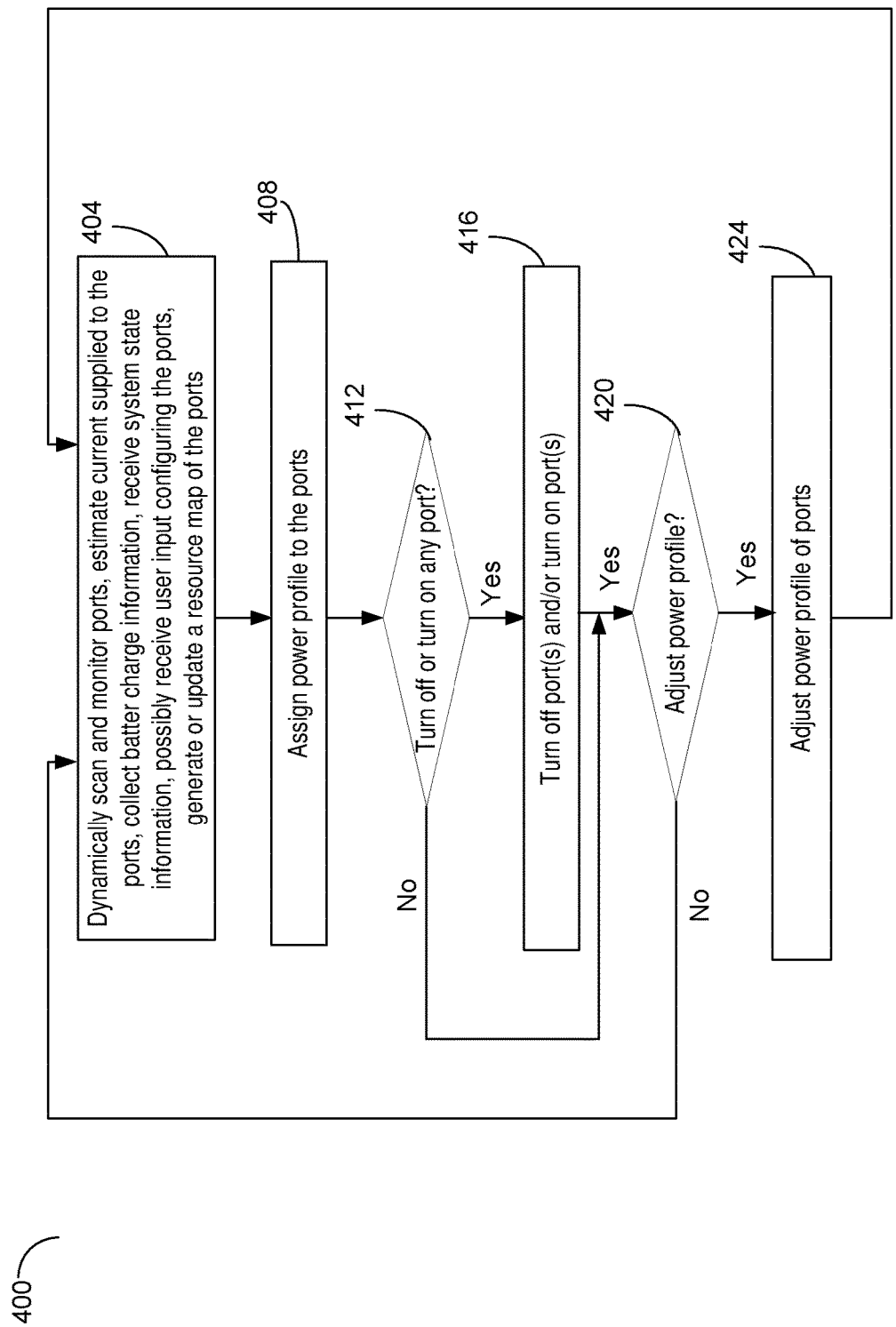
FIG. 4 illustrates a flowchart depicting a method for dynamically turning off or on one or more ports and/or dynamically adjusting power profiles of one or more ports, according to some embodiments.

FIG. 4 illustrates a flowchart depicting a method 400 for dynamically turning off or on one or more ports and/or dynamically adjusting power profiles of one or more ports, according to some embodiments. Although the blocks in the flowchart with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 are optional in accordance with certain embodiments. The numbering of the blocks presented is for the sake of clarity and is not intended to prescribe an order of operations in which the various blocks must occur.

At 404, a system (e.g., the circuitries 126 and/or 326, and/or the controller 124 of the system 300) may dynamically scan and monitor the ports (e.g., ports 118a, 118b, 318a, and 318b) by, for example, monitoring the configuration signals 136a, 136b, 336a, and/or 336b. The scanning and monitoring may, for example, involve determining if a port is occupied by an external device, a power requirement of the external device (e.g., a minimum and/or maximum power demand of the device), etc. Also at 404, the system (e.g., the current monitor circuitry 122) may estimate a current supplied to the ports. Also at 404, the system may also collect battery charge information (e.g., battery charge information 132). Also at 404, the system may receive system state information (e.g., system state information 117), e.g., whether the system operates in one of S0, S1, S2, S3, S4, or S5 states, or another low power state. Also at 404, the system (e.g., the controller 124) may possibly receive user input (e.g., user input 119) configuring the ports.

User input 119 may be received in a variety of manners. Merely as an example, as illustrated in FIG. 6, a user interface window 600 on a display screen of the system 300 may display a warning as follows: "The battery charge of the laptop is likely to be exhausted in about 15 minutes (remaining battery charge level—15%). Do you want to (i) keep on charging the cell phone attached to the laptop without reducing the power delivered to the cell phone, (ii) stop charging the cell phone and turn off the port (that may prolong the battery charge to about 40 minutes), or (iii) reduce the power delivered to the cell phone (that may prolong the battery charge to about 30 minutes)?" In this example, the laptop represents the system 300, and the cell phone represents an external device connected to, for example, the port 118a. Based on a user selecting one of the three options, the controller 124 may perform a corresponding action. In some embodiments, the warning may also display a default action, e.g., the option (iii). It is to be noted that the language and nature of the warning is merely an example, and any other appropriate type of warning message may be displayed (e.g., to warn the user and/or to seek appropriate user input).

FIG. 7 illustrates another example user interface window 700 providing options to configure the ports, according to some embodiments. The window 700 may provide a first example option as follows: "The back-side USB port number 3 has not been used in the last 9 days. Do you want to turn off this port and save power? If you connect a device to this port, the port will automatically be turned on." Options to select "Yes" or "No" is provided. The window 700 may provide a second example option as follows: "If a USB port has not been used for certain period, select an option: (i) Turn of the USB port after not being used for 1 day; (ii) Turn of the USB port after not being used for 1 hour; (iii) Turn of the USB port whenever not being used; or (iv) Never turnoff my USB ports." In some embodiments, instead of or in addition to the four options illustrated in FIG. 7, various other options may also be displayed. Merely as an example, an addition option may be displayed as follows: "(v) Control current for the unused port by reducing a maximum current limit for the unused port, and reassign the current to other ports that are being occupied." In some embodiments, selecting the option (v) may reduce the current allocation of the unused port to 100 mA, and the current may be reassigned to one or more other ports that may be currently occupied. In some embodiments, a sixth option that may be displayed (and although not illustrated in FIG. 7) may be as follows: "(vi) dynamically identify and adjust current for individual USB ports." Based on a user selecting one of these options, the controller 124 may perform a corresponding action. It is to be noted that the language and nature of the window 700 is merely an example, and any other appropriate type of window may be displayed.

Referring again to FIG. 4, at 404, the system may also generate a resource map of the ports. The resource map of a port may, for example, track the current supplied to the port, track a maximum permissible current value of the current supplied to the port (e.g., maximum current value I_max_a), voltage level of the signal supplied to the port, total power available for assignment to ports, etc.

At 408, power profiles may be assigned to the ports. For example, the system may assign current profiles and/or voltage profiles to one or more ports.

At 412, the system (e.g., the controller 124) may decide whether to turn off any port and/or turn on any port. Such a decision may be based on, for example, monitoring the ports to see if the ports are occupied, power available to support external devices occupying the ports, etc. For example, a port may be turned off if the port is not being occupied for at least a threshold period of time, is used infrequently, is currently unoccupied, if available power (e.g., from the battery 114 and/or the power adapter 115) is not sufficient to power all the ports, if the port is physically located at a back side of the system and is infrequently used, and/or the like. In an example, a port may be turned on if a previously turned off port is currently being occupied by an external device.

If "Yes" at 412, then at 416, one or more ports may be turned off and/or one or more ports may be turned on (e.g., by the switching circuitries 116 and/or 316), and the method 400 may proceed to block 420. If "No" at 412, the method 400 may directly proceed to block 420.

At 420, the system may decide whether to adjust power profiles of the ports. Such decision may be based on, for example, power available to support the ports, number of ports that are not turned off or are turned on, a system state (e.g., whether the system is operating at state S0, S3, S4, S5, etc.), battery charge information, etc.

For example, if a port is turned off at 416, the power originally assigned to this port may be reassigned to the remaining occupied ports. In another example, if a power requirement of a device coupled to a port is higher than the power assigned to the power and if additional power is available for reassignment, then the power assigned to the port may be increased. In yet another example, if a port was turned off in the past and is just turned on, this may involve readjustment of the power profiles of the occupied ports (e.g., assuming that a total available power for all the ports is not increased to fully cater to the just turned on port).

In yet another example, the power profile may be dynamically adjusted, and such dynamic adjustment may be based on a system state (e.g., whether the system is operating at state S0, S3, S4, S5, etc.), etc. For example, a change in the system state may involve reassignment of the power profiles (e.g., as a change in a system state may change a total power available for assignment to the ports).

If "Yes" at 420, the method 400 proceeds to 424, where the power profile may be adjusted dynamically. For example, a power profile (e.g., a voltage profile and/or a current profile) may be dynamically adjusted for a port, e.g., a type-C USB port, as discussed in details herein in this disclosure (e.g., discussed with respect to FIGS. 1-3). In some embodiments, the method 400 may then loop back to block 404. If "No" at 420, the method 400 may loop back to block 404.

Figure 5:
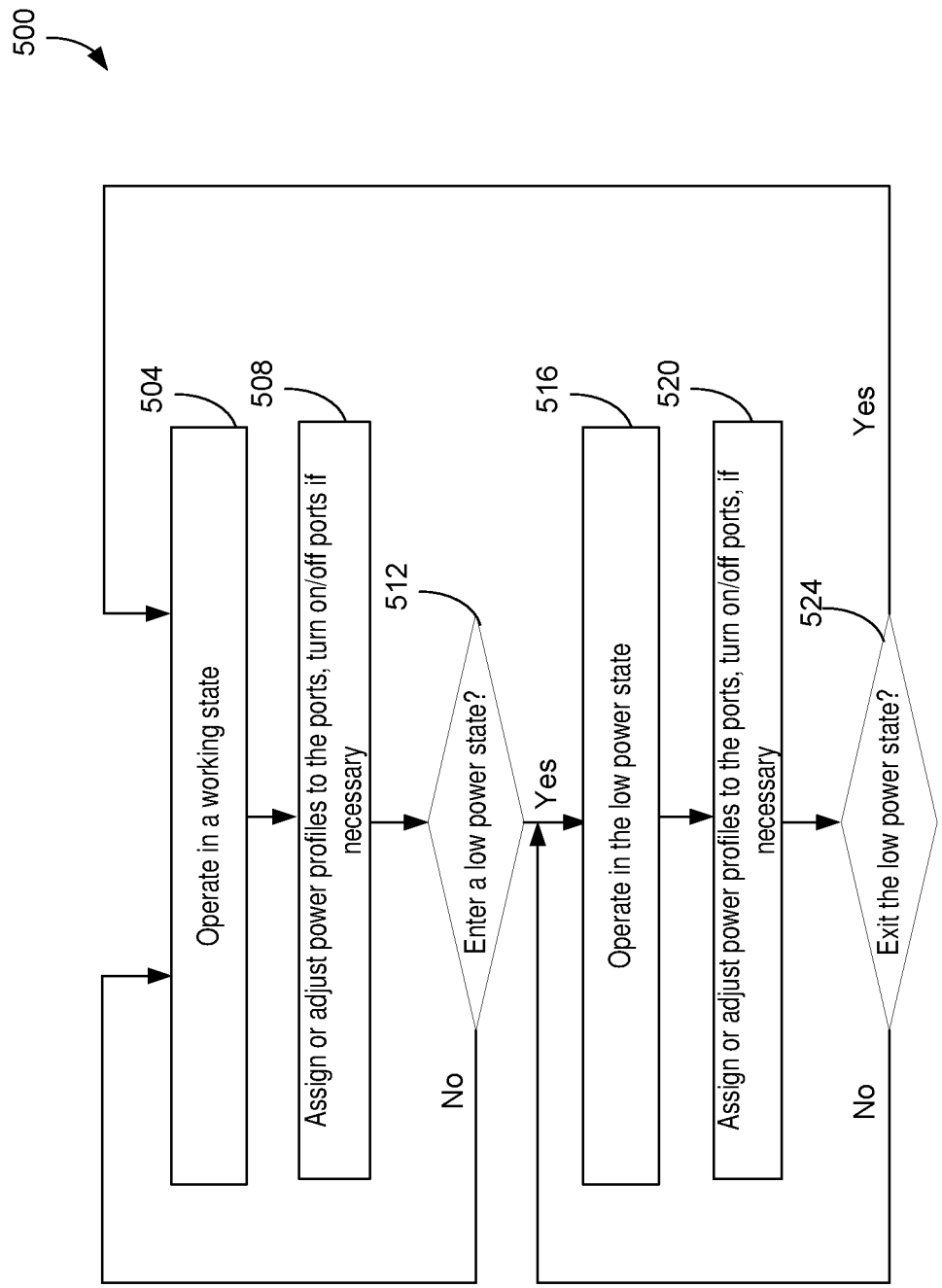
FIG. 5 illustrates a flowchart depicting a method for dynamically adjusting power profiles of one or more ports based on a system state, according to some embodiments.

FIG. 5 illustrates a flowchart depicting a method 500 for dynamically adjusting power profiles of one or more ports based on a system state, according to some embodiments. Although the blocks in the flowchart with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur.

At 504, a system (e.g., the system 300) may operate in a working state (e.g., the S0 state). At 508, power profiles of various ports (e.g., ports 118a, 118b, 318a, 318b) may be assigned and/or adjusted, and/or one or more ports are turned on or turned off dynamically, if necessary. Such adjustment or assignment of the power profiles and/or turning on or off the ports may be, for example, performed in accordance with the method 400 of FIG. 4.

At 512, a decision may be made as to whether to enter a low power state. Such a decision may be based on multiple factors, e.g., current operating load of the system, inactivity of the system for a threshold period of time, etc., as is well known to those skilled in the art.

If "No" at 512, the method 500 loops back to block 504 of the method 500. If "Yes" at 512, the method 500 proceeds to block 516, where the system may operate in a low power state (e.g., one of states S1, S2, S3, S4, S5, or another appropriate low power mode).

At 520, power profiles of various ports may be assigned and/or adjusted, and/or one or more ports are turned on or turned off, if necessary. Such adjustment or assignment of the power profiles and/or turning on or off the ports may be, for example, performed in accordance with the method 400 of FIG. 4. Merely as an example, a change of a system state may change an available power for the ports, based on which the power profiles may be adjusted.

At 524, a decision is made as to whether to exit the low power state. Such a decision may be based on multiple factors, e.g., current operating load of the system, activity of the system, etc., as is well known to those skilled in the art. If "No" at 524, the method 500 loops back to block 516 of the method 500. If "Yes" at 524, the method 500 loops back to block 504 of the method 500.

Figure 8:
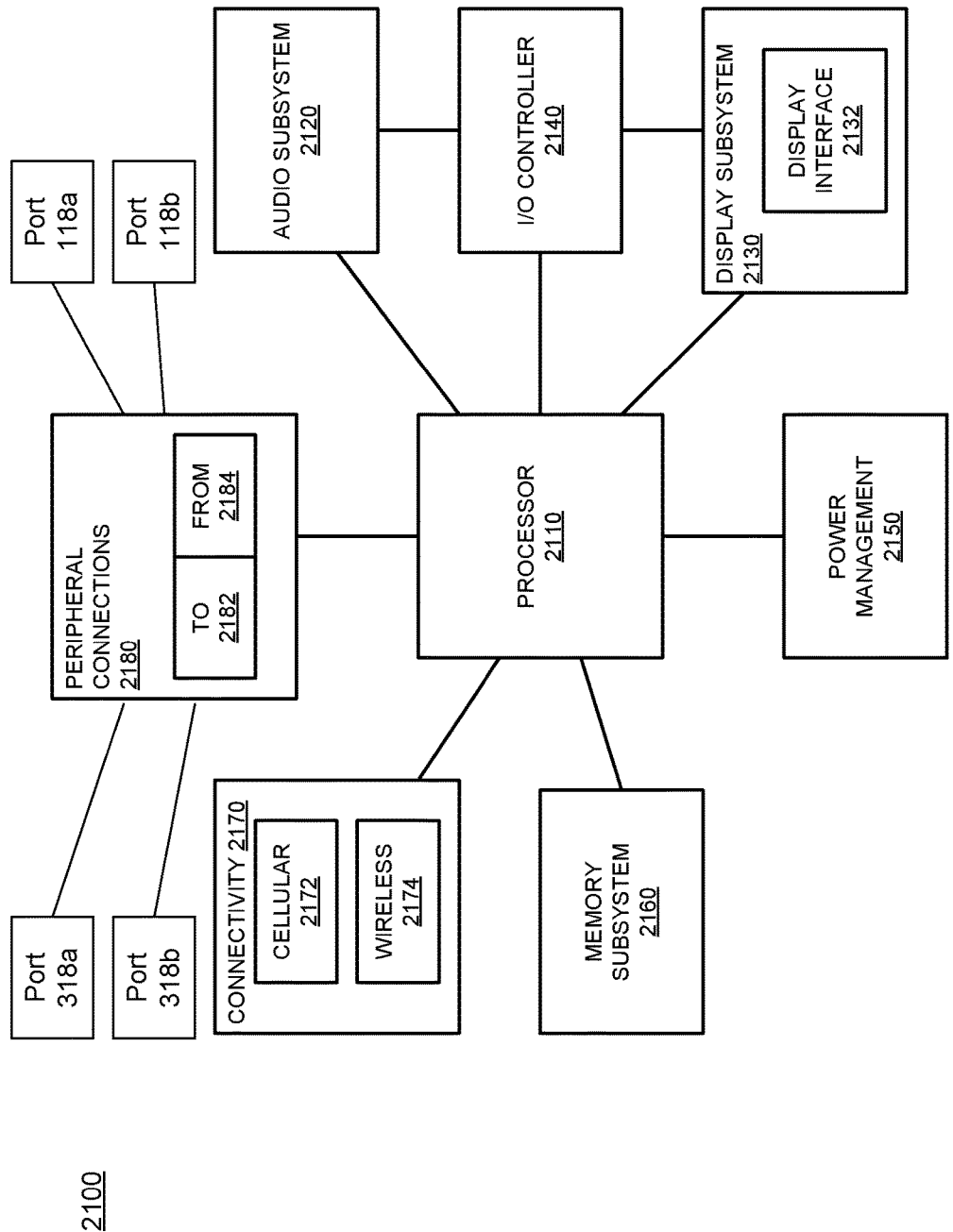
FIG. 8 illustrates a computer system or a SoC (System-on-Chip), where a power profile of a port may be dynamically changed and/or a port may be selectively turned on or off for various system states, in accordance with some embodiments.

FIG. 8 illustrates a computer system or a SoC (System-on-Chip) 2100, where a power profile of a port (e.g., ports 118a, 118b, 318a, and/or 318b) may be dynamically changed and/or a port may be selectively turned on or off for various system states, in accordance with some embodiments. It is pointed out that those elements of FIG. 8 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the peripheral connections 2180 may comprise or may be attached to one or more I/O ports, e.g., ports 118a. 118b, 318a and/or 318b. In some embodiments, the computing device 2100 may comprise arrangement to assign and/or adjust the power profiles of these ports, and/or selectively turn off or on these ports, e.g., as discussed with respect to FIGS. 1-7.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1. An apparatus comprising: a port to receive a device external to the apparatus; and a controller to selectively turn on or turn off the port.

Clause 2. The apparatus of clause 1, wherein: the controller is to turn off the port in response to the port not currently being occupied by any device.

Clause 3. The apparatus of any of clauses 1 or 2, wherein: the controller is to turn off the port in response to the port not being occupied by any device for at least a threshold period of time.

Clause 4. The apparatus of any of clauses 1-3, wherein: the controller is to turn off the port in response to an unavailability of power to be supplied to the port.

Clause 5. The apparatus of any of clauses 1-4, further comprising: a port control circuitry to generate a power supply; and a switching circuitry coupled between the port and the port control circuitry, wherein the controller is to turn off the port by controlling the switching circuitry to electrically disconnect the port from the port control circuitry.

Clause 6. The apparatus of clause 5, wherein the controller is to turn on the port by controlling the switching circuitry to electrically connect the port to the port control circuitry, such that the port is to receive the power supply generated by the port control circuitry.

Clause 7. The apparatus of any of clauses 1-6, wherein: the port is a first port; the apparatus further comprises a second port; the controller is to assign a first power profile to the first port and a second power profile to the second port, in response to the apparatus operating in a normal working state; and the controller is to adjust the first power profile assigned to the first port and/or the second power profile assigned to the second port, in response to the apparatus operating in a low power state.

Clause 8. The apparatus of clause 7, wherein: the normal working state comprises a S0 state; and the low power state comprises one of a S3 standby or sleep state, a S4 hibernation or suspend to disk state, or a S5 soft off state.

Clause 9. The apparatus of any of clauses 1-6, wherein: the controller is to turn on the port in response to the port being occupied, and while the apparatus operates in any one of a S0 working state, a S3 standby or sleep state, a S4 hibernation or suspend to disk state, or a S5 soft off state.

Clause 10. The apparatus of any of clauses 1-9, wherein: the controller is to assign or adjust a power profile of a power supplied by a port control circuitry to the port by one or more of: adjusting a voltage level of a signal supplied to the port, adjusting a maximum permissible current level of the signal supplied to the port, or adjusting a current level of the signal supplied to the port.

Clause 11. The apparatus of any of clauses 1-6 or 9-10, wherein the port is a first port, and wherein the apparatus further comprises: a second port and a third port, wherein the controller is to turn off the first port, wherein the first port is assigned a first amount of power prior to being turned off, and wherein the controller is to reassign the first amount of power among the second port and the third port.

Clause 12. The apparatus of any of clauses 1-11, wherein the port is a Universal Serial Bus (USB).

Clause 13. The apparatus of any of clauses 1-12, wherein the port is a Universal Serial Bus (USB) type-C port.

Clause 14. The apparatus of any of clauses 1-13, wherein the controller is to selectively turn on or turn off the port based at least in part on one or more of: a state of the apparatus; charging information associated with a battery of the apparatus; occupancy information of the port; power available to supply to the port; or availability of Alternating Current (AC) power for powering the apparatus.

Clause 15. A system comprising: a battery to selectively supply power to the system; a Universal Serial Bus (USB) port; a circuitry to sense if the USB port is occupied; and a controller to cut off power supply to the USB port, in response to no external device being attached to the USB port.

Clause 16. The system of clause 15, further comprising: a switching circuitry to supply power from the circuitry to the USB port, wherein the controller is to cut off power supply to the USB port by controlling the switching circuitry.

Clause 17. The system of any of clauses 15-16, wherein the USB port is a USB type-C port.

Clause 18. The system of any of clauses 15-17, wherein the controller is to cut off the power supply to the USB port, in response to one or both of: no external device being currently attached to the USB port, or no external device being attached to the USB port for at least a threshold period of time.

Clause 19. The system of any of clauses 15-18, wherein: the system operates in one of a S0 state, S3 state, S4 state, or S5 states, the controller is to turn on the power supply to the USB port, in response to an external device being attached to the USB port, and the controller is to assign or adjust a power profile for the USB port, based at least in part of an operating state of the system.

Clause 20. One or more non-transitory computer-readable storage media configured to store instructions that, when executed by a processor included in an apparatus, cause the processor to: monitor an input/output (I/O) port; and refrain from supplying power to the I/O port, in response to monitoring the I/O port.

Clause 21. The one or more non-transitory computer-readable storage media of clause 20, wherein the instructions further cause the processor to: refrain from supplying power to the I/O port, in response to the I/O port not being occupied by a device external to the apparatus.

Clause 22. The one or more non-transitory computer-readable storage media of clause 20, wherein the instructions further cause the processor to: assign a first power value, which was originally assigned to the I/O port, to one or more other I/O ports, in response to refraining from supplying power to the I/O port.

Clause 23. A method comprising: monitoring an input/output (I/O) port; and refraining from supplying power to the I/O port, in response to monitoring the I/O port.

Clause 24. The method of clause 23, wherein refraining from supplying power to the I/O port comprises: refraining from supplying power to the I/O port, in response to the I/O port not being occupied by a device external to the apparatus.

Clause 25. The method of any of clauses 23-24, further comprising: assigning a first power value, which was originally assigned to the I/O port, to one or more other I/O ports, in response to refraining from supplying power to the I/O port.

Clause 26. The method of any of clauses 23-25, wherein the I/O port is a Universal Serial Bus (USB) type-C port.

Clause 27. A machine-readable medium including code, when executed, to cause a machine to perform the method of any one of clauses 23-26.

Clause 28. An apparatus comprising: means for performing the method in any of the clauses 23-26.

Clause 29. An apparatus comprising: means for monitoring an input/output (I/O) port; and means for refraining from supplying power to the I/O port, in response to monitoring the I/O port.

Clause 30. The apparatus of clause 29, wherein the means for refraining from supplying power to the I/O port comprises: means for refraining from supplying power to the I/O port, in response to the I/O port not being occupied by a device external to the apparatus.

Clause 31. The apparatus of any of clauses 29-30, further comprising: means for assigning a first power value, which was originally assigned to the I/O port, to one or more other I/O ports, in response to refraining from supplying power to the I/O port.

Clause 32. The apparatus of any of clauses 29-31, wherein the I/O port is a Universal Serial Bus (USB) type-C port.

Clause 33. A method comprising: monitoring a Universal Serial Bus (USB) type-C port; and refraining from supplying power to the USB type-C port, in response to monitoring the USB type-C port.

Clause 34. The method of clause 33, wherein refraining from supplying power to the USB type-C port comprises: refraining from supplying power to the USB type-C port, in response to the USB type-C port not being occupied by a device external to the apparatus.

Clause 35. The method of any of clauses 33-34, further comprising: assigning a first power value, which was originally assigned to the USB type-C port, to one or more other USB type-C port, in response to refraining from supplying power to the USB type-C port.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first port to receive a device external to the apparatus;
a second port, and a third port; and
a controller to selectively turn on or turn off the first port,
wherein the controller is to turn off the first port in response to the first port not being occupied,
wherein the first port is assigned a first amount of power prior to being turned off, and
wherein the controller is to reassign the first amount of power among the second port and the third port, in response to the first port being turned off for not being occupied.

2. The apparatus of claim 1, wherein:
the controller is to turn off the first port in response to the first port not being occupied by any device for at least a threshold period of time.

3. The apparatus of claim 1, wherein:
the controller is to turn off the first port in response to an unavailability of power to be supplied to the first port.

4. The apparatus of claim 1, further comprising:
a port control circuitry to generate a power supply; and
a switch circuitry coupled between the first port and the port control circuitry,
wherein the controller is to turn off the first port by controlling the switch circuitry to electrically disconnect the first port from the port control circuitry.

5. The apparatus of claim 4, wherein the controller is to turn on the first port by control of the switch circuitry to electrically connect the first port to the port control circuitry, such that the first port is to receive the power supply generated by the port control circuitry.

6. The apparatus of claim 1, wherein:
the controller is to assign a first power profile to the first port and a second power profile to the second port, in response to an operation of the apparatus in a normal work state; and
the controller is to adjust the first power profile assigned to the first port and/or the second power profile assigned to the second port, in response to an operation of the apparatus in a low power state.

7. The apparatus of claim 6, wherein:
the normal work state comprises a S0 state; and
the low power state comprises one of: a S3 standby or sleep state, a S4 hibernation or suspend to disk state, or a S5 soft off state.

8. The apparatus of claim 1, wherein:
the controller is to turn on the first port in response to the first port being occupied, and while the apparatus operates in any one of: a S0 working state, a S3 standby or sleep state, a S4 hibernation or suspend to disk state, or a S5 soft off state.

9. The apparatus of claim 1, wherein:
the controller is to assign or adjust a power profile of a power supplied by a port control circuitry to the first port by one or more of:
adjustment of a voltage level of a signal supplied to the first port,
adjustment of a maximum permissible current level of the signal supplied to the first port, or
adjustment of a current level of the signal supplied to the first port.

10. The apparatus of claim 1, wherein the first port is a Universal Serial Bus (USB).

11. The apparatus of claim 1, wherein the first port is a Universal Serial Bus (USB) type-C port.

12. The apparatus of claim 1, wherein the controller is to selectively turn on or turn off the first port based at least in part on one or more of:
a state of the apparatus;
charge information associated with a battery of the apparatus;
occupancy information of the first port;
power available to supply to the first port; or
availability of Alternating Current (AC) power to power the apparatus.

13. A system comprising:
a battery to selectively supply power to the system;
a first Universal Serial Bus (USB) port, a second USB port, and a third USB port;
a circuitry to sense if the first USB port is occupied; and
a controller to:
cut off power supply to the first USB port, in response to no external device being attached to the first USB port for at least a non-zero threshold period of time, wherein the controller is to assign a first amount of power to the first USB port prior to the power to the first USB port being cut off, and
reassign the first amount of power among one or both the second USB port or the third USB port, in response to the power to the first USB port being cut off.

14. The system of claim 13, further comprising:
a switch circuitry to supply power from the circuitry to the first USB port,
wherein the controller is to cut off power supply to the first USB port by control of the switch circuitry.

15. The system of claim 13, wherein the first USB port is a USB type-C port.

16. The system of claim 13, wherein:
the system operates in one of: a S0 state, S3 state, S4 state, or S5 states;
the controller is to turn on the power supply to the first USB port, in response to an external device being attached to the first USB port; and
the controller is to assign or adjust a power profile for the first USB port, based at least in part of an operative state of the system.

17. One or more non-transitory computer-readable storage media configured to store instructions that, when executed by a processor included in an apparatus, cause the processor to:
monitor a first input/output (I/O) port;
refrain from supplying power to the first I/O port, in response to determining that the first I/O port is not occupied for at least a threshold period of time;
reassign power budget of the first I/O port to one or both a second or a third I/O port.

18. The one or more non-transitory computer-readable storage media of claim 17, wherein the instructions further cause the processor to:
refrain from supplying power to the first I/O port, further in response to determining that a frequency of usage of the first I/O port is less than a threshold value.

19. The apparatus of claim 1, wherein:
the controller is to turn on the first port in response to the first port being occupied;
the first port is assigned the first amount of power, while being turned on and in response to a charge level of a battery of the apparatus being higher than a threshold value; and
the first port is assigned a modified first amount of power, while being turned on and in response to the charge level of the battery of the apparatus being lower than the threshold value, wherein the modified first amount is lower than the first amount.

20. The apparatus of claim 1, wherein:
the controller is to turn on the first port in response to the first port being occupied;
the first port is assigned the first amount of power, while being turned on and in response to reception of power by the apparatus from an external power source via an adapter; and
the first port is assigned a modified first amount of power, while being turned on and in response to reception of power being ceased from any external power source, wherein the modified first amount is lower than the first amount.

21. The apparatus of claim 1, wherein:
the controller is to turn on the first port in response to the first port being occupied;
the first port is assigned the first amount of power, while being turned on and in response to an operation of the apparatus in a normal power mode; and
the first port is assigned a modified first amount of power, while being turned on and in response to an operation of the apparatus in a low power mode, wherein the modified first amount is higher than the first amount.

22. The apparatus of claim 1, wherein:
the controller is to turn off the first port, in response to:
the first port not being occupied, and
a determination that a frequency of usage of the first port is less than a threshold value.

* * * * *